No. 889,465.
PATENTED JUNE 2, 1908.

T. H. KELLER, J. A. HAAS & H. B. & J. H. KELLER.
MOLDING MACHINE.
APPLICATION FILED MAY 9, 1906. RENEWED MAY 31, 1907.

WITNESSES

INVENTORS
Thomas H. Keller
John H. Haas
Henry B. Keller
Julius H. Keller
BY
ATTORNEYS No. 889,465.

PATENTED JUNE 2, 1908.

T. H. KELLER, J. A. HAAS & H. B. & J. H. KELLER.

MOLDING MACHINE.

APPLICATION FILED MAY 9, 1906. RENEWED MAY 31, 1907.

WITNESSES

INVENTORS
Thomas H. Keller
John A. Haas
Henry B. Keller
Julius H. Keller
BY
Munn & Co
ATTORNEYS

No. 889,465. PATENTED JUNE 2, 1908.
T. H. KELLER, J. A. HAAS & H. B. & J. H. KELLER.
MOLDING MACHINE.
APPLICATION FILED MAY 9, 1906. RENEWED MAY 31, 1907.

WITNESSES

INVENTORS
Thomas H. Keller
John A. Haas
Henry B. Keller
Julius H. Keller
BY
ATTORNEYS

No. 889,465. PATENTED JUNE 2, 1908.
T. H. KELLER, J. A. HAAS & H. B. & J. H. KELLER.
MOLDING MACHINE.
APPLICATION FILED MAY 9, 1906. RENEWED MAY 31, 1907.

WITNESSES

INVENTORS
Thomas H. Keller
John A. Haas
Henry B. Keller
Julius H. Keller
BY

ATTORNEYS

UNITED STATES PATENT OFFICE.

THOMAS H. KELLER AND JOHN A. HAAS, OF LANCASTER, HENRY B. KELLER, OF PHILADELPHIA, AND JULIUS H. KELLER, OF LITITZ, PENNSYLVANIA, ASSIGNORS OF EIGHT-TWENTIETHS TO SAID THOMAS H. KELLER, EIGHT-TWENTIETHS TO SAID JOHN A. HAAS, TWO-TWENTIETHS TO SAID HENRY B. KELLER, AND TWO-TWENTIETHS TO SAID JULIUS H. KELLER.

MOLDING-MACHINE.

No. 889,465.   Specification of Letters Patent.   Patented June 2, 1908.

Application filed May 9, 1906, Serial No. 316,012. Renewed May 31, 1907. Serial No. 376,501.

*To all whom it may concern:*

Be it known that we, THOMAS H. KELLER and JOHN A. HAAS, both citizens of the United States, and residents of Lancaster, in the county of Lancaster and State of Pennsylvania, HENRY B. KELLER, a citizen of the United States, and a resident of Philadelphia, in the county of Philadelphia and State of Pennsylvania, and JULIUS H. KELLER, a citizen of the United States, and a resident of Lititz, in the county of Lancaster and State of Pennsylvania, have invented a new and Improved Molding-Machine, of which the following is a full, clear, and exact description.

The invention relates to bread-making machinery, and its object is to provide a new and improved shaping or molding machine designed to give a desired predetermined shape to a lump of dough or a like material, and arranged to render the material homogeneous by pressing out any air or gases contained in the material, then forming it into shape and maintaining the same during the subsequent rising and baking process, to prevent the finished loaf or roll from breaking or cracking, and to provide the lump or roll with a smooth exterior surface.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement.

On a suitably constructed frame A are mounted a flattening device B, a turning-up device C and pressing and rolling devices D and D', both alike in construction, the several devices B, C, D and D' being arranged and operating in unison in the sequence mentioned, so that a lump of dough or other material is first acted on by the flattening device B, and pressed and flattened to drive out any air or gases that may be contained in the material, to render the latter more homogeneous, and then the material is turned up at the ends by the turning device C (see Fig. 12), after which the material is subjected to a rolling and pressing action by the device D, whereby the material is rolled around in one direction and simultaneously pressed into the desired shape, after which the shaped material is subjected to another rolling and pressing action by the device D', whereby the material is rolled in a reverse direction and simultaneously pressed into final shape, so that the twist given to the material by the first device D (see Fig. 13) is taken out of the material and a reverse twist is given to the material (see Fig. 14) and the latter is now in proper condition for the subsequent rising and baking process.

The detailed construction is as follows: On the frame A is secured a hopper E, the open bottom of which extends over an endless apron F of canvas or other suitable fabric material, which forms a member of the flattening device B, the turning up device C, and the pressing and rolling device D. The endless apron F extends around drums F', F², and the shaft F³ of the drum F² is journaled in fixed bearings on the main frame A, while the shaft F⁴ of the drum F' is journaled in bearings G mounted to slide longitudinally in suitable guideways A' arranged on the main frame A. Into the bearings G screw the screw rods G' mounted to turn in suitable bearings on the frame A, and on the outer ends of the screw rods G' are secured bevel gear wheels G² in mesh with bevel gear wheels $G^3$ secured on a transverse shaft $G^4$ journaled in suitable bearings on the main frame, and carrying on one end a hand wheel $G^5$, under the control of the operator for turning the shaft $G^4$ with a view to rotating the screw rods $G'$ to move the bearings $G$ inward or outward, to shift the shaft $F^4$ and its drum $F'$, and thereby give the desired tension to the endless apron $F$. On the shafts $F^4$, $F^3$ are secured sets of sprocket wheels $F^5$, $F^6$ over which pass the sprocket chains $F^7$, so that when the shaft $F^4$ is driven a positive rotation is given to the shaft $F^3$ to insure rotation in unison of both drums $F'$ and $F^2$ and travel of the apron $F$ without danger of stopping. The lower runs of the sprocket chains $F^7$ pass over a tightening roller $F^8$ held on a shaft $F^9$ journaled in bearings $F^{10}$ adjustably mounted in the main frame $A$, as plainly shown in Fig. 1. The lower run of the apron $F$ also passes over this tightening roller $F^8$.

In the hopper $E$ extend longitudinally gages $E'$ engaged by clamping screws $E^2$ extending through elongated slots $E^3$ formed on the inclined back board $E^4$ of the hopper $E$, to allow of adjusting the gages $E'$ towards and from each other according to the size of the lump of dough to be treated at a time. The under surfaces of the gages $E'$ extend directly over the top surface of the upper run of the endless apron $F$, as plainly illustrated in Fig. 3, and the top surfaces of the gages $E'$ have segmental portions $E^5$ and $E^6$, of which the segmental portions $E^5$ are engaged by the peripheral surface of the roller $B'$ of the flattening device $B$, and the segmental portions $E^6$ are engaged by the peripheral surface of the roller $C'$ of the turning up device $C$. The shaft $B^2$ for the roller $B'$ is journaled in suitable bearings $B^3$ mounted to slide vertically in guideways $A^2$ formed on the main frame $A$, and in the bearings $B^3$ screw vertically disposed screw rods $B^4$ mounted to turn in suitable bearings arranged on the main frame $A$. On the upper ends of the screw rods $B^4$ are secured bevel gear wheels $B^5$ in mesh with bevel gear wheels $B^6$ secured on a transverse shaft $B^7$ journaled in suitable bearings on the main frame $A$, and provided at one outer end with a hand wheel $B^8$ for turning the shaft $B^7$ and, consequently, the screw rods $B^4$ to raise or lower the bearings $B^3$ and the roller $B'$ to bring the latter in proper relation to the upper run of the apron $F$ and the gages $E'$. The shaft $C^2$ for the roller $C'$ is mounted in bearings $C^3$ fitted to slide vertically in guideways $A^3$ arranged on the main frame $A$, and in the said bearings $C^3$ screw vertically disposed screw rods $C^4$ mounted to turn in bearings on the main frame $A$. The upper ends of the screw rods $C^4$ are provided with bevel gear wheels $C^5$ in mesh with bevel gear wheels $C^6$ secured on a transverse shaft $C^7$ journaled in bearings on the main frame $A$, and on one outer end of the said shaft $C^7$ is secured a hand wheel $C^8$, under the control of the operator, for turning the shaft $C^7$ to rotate the screw rods $C^4$ with a view to raise or lower the bearings $C^3$ and the roller $C'$, to bring the latter in proper relation to the upper run of the apron $F$ and to the gages $E'$.

Figure 3:
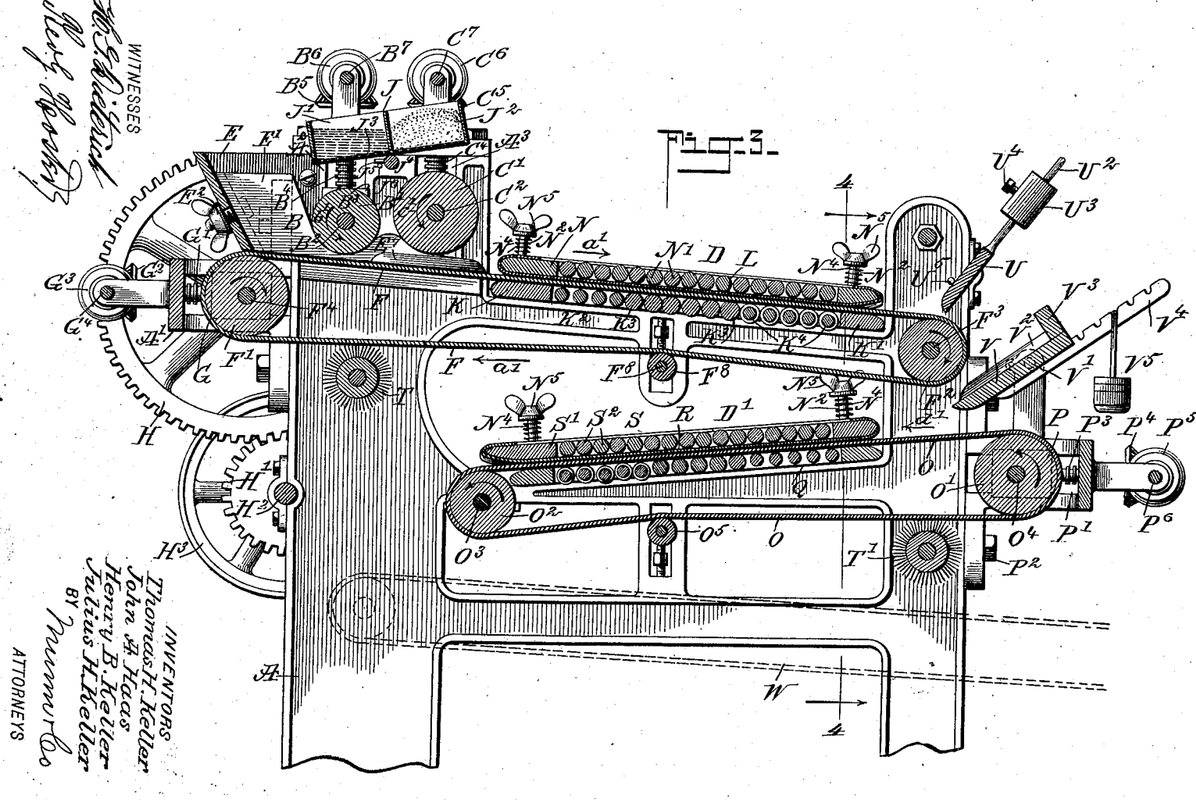
Fig. 3 is a longitudinal sectional side elevation of the same on the line 3—3 of Fig. 2.
Figures 5, 6, 12, 13, 14:
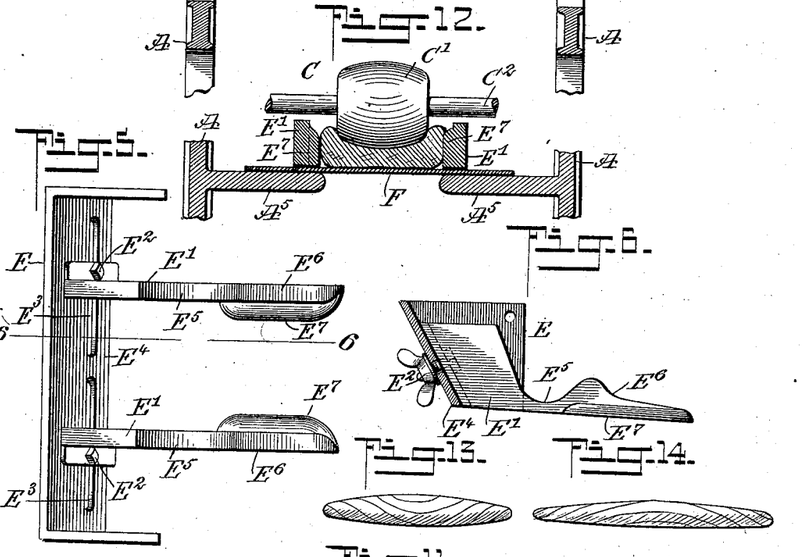
Fig. 5 is a plan view of the hopper.
Fig. 6 is a sectional side elevation of the same on the line 6—6 of Fig. 5.
Fig. 12 is an enlarged transverse section of the turning device and showing the ends of the material turned up.
Fig. 13 is a plan view of the material as it appears after leaving the first pressing and rolling device.
Fig. 14 is a like view of the same as it appears after leaving the second pressing and rolling device.

The peripheral surface of the roller $B'$ is straight while that of the roller $C'$ is convex and operates in conjunction with flanges $E^7$ extending toward each other from the inner faces of the gages $E'$ (see Figs. 3, 5 and 6). The flanges $E^7$ are disposed on opposite sides of the roller $C'$ and when the dough is thrown into the hopper $E$ between the gages $E'$ in front of the roller $B'$ then the upper run of the apron $F$ carries the dough successively under the rollers $B'$ and $C'$. Now, the roller $B'$ presses and flattens the dough so as to press out any air or gas contained in the dough, and then the flattened dough is carried along by the apron $F$ and between the flanges $E^7$ which tend to turn up the ends of the dough, and as the latter passes under the convex peripheral surface of the roller $C'$ the ends of the dough are completely turned up, as will be readily understood by reference to Fig. 12.

In order to impart a traveling motion to the belt $F$ in the direction of the arrows $a'$ and to rotate the rollers $B'$ and $C'$ in the directions of the arrows $b'$, $c'$ (see Fig. 3) the following device is provided: On one outer end of the shaft $F^4$ is secured a gear wheel $H$ in mesh with a pinion $H'$ fastened to a main driving shaft $H^2$ provided with a pulley $H^3$ connected by a belt with other machinery for imparting a rotary motion to the main driving shaft $H^2$. The rotary motion of the latter is transmitted by the pinion $H'$ and the gear wheel $H$ to the shaft $F^4$ to rotate the drum $F'$, thereby imparting a traveling motion to the apron $F$ in the direction of the arrow $a'$.

On the outer ends of the shafts $B^2$ and $C^2$ are secured sprocket wheels $B^9$, $C^9$ over which passes a sprocket chain $I$, also passing over a sprocket wheel $F^{11}$, secured on the driven shaft $F^4$, and the said sprocket chain $I$ also passes over a tightening roller $I'$, journaled on a stud $I^2$ held on an arm $I^3$ fulcrumed at $I^4$ on the main frame $A$, as plainly shown in Fig. 1. A clamping bolt $I^5$ engages the arm $I^3$ and extends through a segmental slot $A^4$ arranged on one side of the main frame $A$, so that the arm $I^3$ can be adjusted to give the desired tension to the sprocket chain $I$, and when this has been done the arm $I^3$ is secured in place by screwing up the nut on the bolt $I^5$. Now, when the machine is running and the shaft $F^4$ is rotated, as previously explained, then a traveling motion is given by the sprocket wheel $F^{11}$ to the sprocket chain $I$, and as the latter passes over the sprocket wheels $B^9$, $C^9$ it is evident that the rollers $B'$ and $C'$ are rotated in the direction of the arrows $b'$, $c'$, as shown in Fig. 3.

Figure 7:
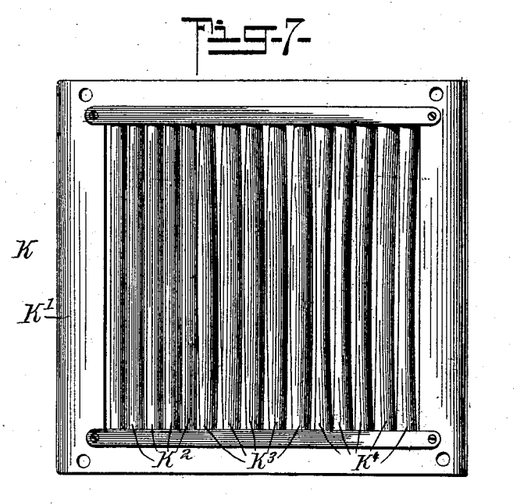
Fig. 7 is a plan view of the resistance for the traveling apron.

In order to prevent the dough from sticking to the apron F or to the surfaces of other contacting parts, such as the rollers $B'$, $C'$ and the flanges $E^7$, it is desirable to sprinkle grease or flour or both onto the dough, and for this purpose a box J is provided located above the rollers $B'$, $C'$ and having, preferably, two compartments $J'$, $J^2$, one for containing grease and the other for containing flour, the bottom $J^3$ of the box J being perforated, as indicated in Fig. 3. A slight shaking motion is given periodically to the box J to insure a ready outflow of the grease or flour by way of the perforations in the bottom $J^3$. For this purpose the box J is mounted on a transversely extending rock shaft $J^4$ journaled on the main frame A and having an arm $J^5$ normally resting on a pin $J^6$ projecting from the frame A, see Fig. 3. On one outer end of the shaft $J^4$ is secured an arm $J^7$ adapted to be engaged by a pin $J^8$ secured to the shaft $C^2$, so that when the latter is rotated the pin $J^8$ imparts periodically a slight swinging motion to the arm $J^7$ to rock the shaft $J^4$ with a view to shaking the box J for the purpose above mentioned. If desired, the roller $B'$ may be hollow and filled with grease or flour adapted to flow out through perforations in the rim of the roller, as will be understood by reference to Fig. 10. This hollow roller $B'$ is provided at one end with a suitable filling cap, as indicated in the said Fig. 10. The upper run of the apron F between the turning up device C and the drum $F^2$ passes over a resistance or bed K of various constructions (see Figs. 7, 8 and 9), the construction varying according to the shape to be given to the dough. This resistance or bed K, as shown in Figs. 3 and 7, for instance, is constructed to give the dough the form of a Vienna roll, tapering from the middle to the ends, as indicated in Figs. 13 and 14. The resistance K shown in Figs. 3 and 7 consists of a resistance frame $K'$ attached to the main frame A, and in the said resistance frame $K'$ are journaled sets of transversely extending rollers $K^2$, $K^3$ and $K^4$, arranged one alongside the other, and of which the rollers $K^2$ are cylindrical, the rollers $K^3$ are convex or tapering from the middle to the ends, and the rollers $K^4$ are concave or gradually increasing from the middle to the ends, as plainly indicated in Fig. 7.

Figure 4:
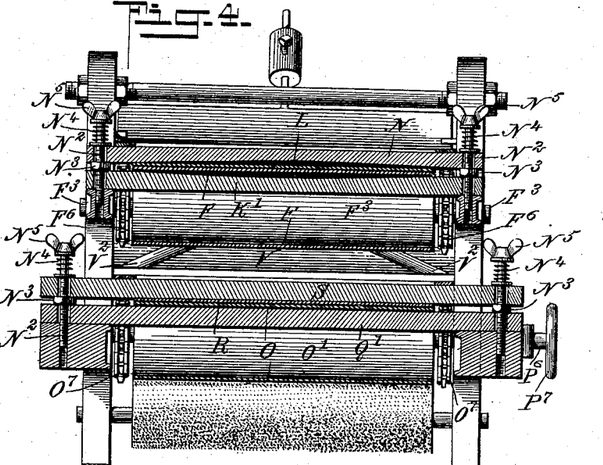
Fig. 4 is a transverse section of the same on the line 4—4 of Fig. 3.

Directly above the upper run of the apron F opposite the resistance K is arranged a sheet L of canvas or other fabric material, and this sheet L is stretched on the underside of a resistance frame N in which are journaled transverse rollers $N'$ arranged one alongside the other and preferably cylindrical in shape, the rollers forming with the frame N a resistance for the sheet L. The frame N is mounted to slide loosely up and down on screw rods $N^2$ extending loosely through the frame $K'$ and screwed or otherwise secured in the frame A (see Fig. 4), and on the said screw rods $N^2$ screw nuts $N^3$ for supporting the frame N normally held down on the nuts $N^3$ by springs $N^4$ coiled on the upper ends of the screw rods $N^2$. Wing nuts $N^5$ screw on the upper ends of the screw rods $N^2$, to regulate the tension of the springs $N^4$, so as to allow the frame N and its rollers $N'$ together with the sheet L to yield as the material passes between the upper run of the apron F and the sheet L. The upper and lower ends of the frames $K'$ and N are curved to form flaring entrances and exits for the dough as the latter enters and leaves the pressing and rolling device D, and the lower ends of the frame N are preferably concaved on the under sides to maintain the Vienna roll shape given to the material by the combined action of the apron F, the rollers $K^4$, sheet L and the lowermost rollers $N'$.

The second pressing and rolling device $D'$ is the same in construction as the rolling device D and is provided with an endless apron O passing over drums $O'$, $O^2$, of which the latter has a shaft $O^3$ journaled in fixed bearings on the main frame A, while the shaft $O^4$ of the drum $O'$ is journaled in bearings P mounted to slide longitudinally in guideways $P'$ adjustably secured by bolts $P^2$ to the main frame A, so as to allow of raising and lowering the guideways $P'$ and with them the drum $O'$. In the bearings P screw rods $P^3$ journaled in bearings attached to the guideways $P'$, and on the outer ends of said screw rods $P^3$ are secured bevel gear wheels $P^4$ in mesh with bevel gear wheels $P^5$ secured on a shaft $P^6$ journaled in suitable bearings arranged on the guideways $P'$. On one end of the shaft $P^6$ is secured a hand wheel $P^7$ adapted to be turned by the operator to rotate the shaft $P^6$, and, consequently, the screw rods $P^3$, so as to move the bearings P inward or outward and, consequently, the drum $O'$ to give the desired tension to the endless apron O. The underside of the upper run of the apron O passes over a resistance Q, similar to the resistance K, and attached to the main frame A, so that further description of the said resistance Q is not deemed necessary.

Figure 2:
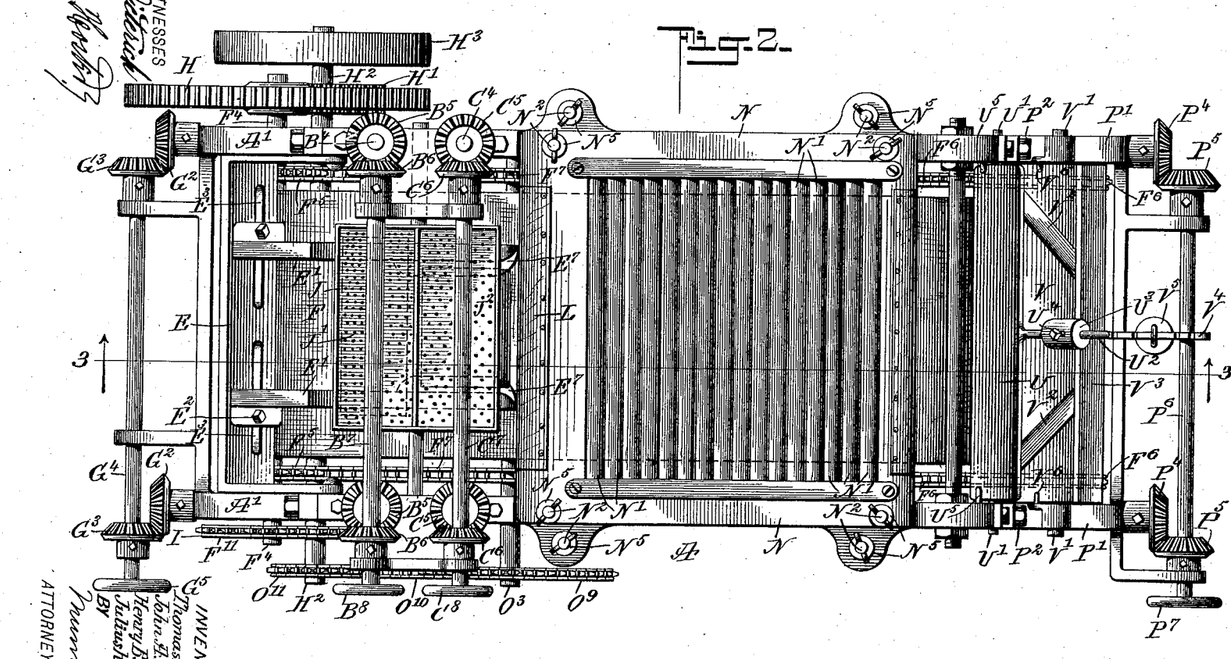
Fig. 2 is a plan view of the same.

The upper run of the apron O operates in conjunction with a sheet R, similar to the sheet L, and a resistance S consisting of a frame $S'$ in which are journaled transversely extending rollers $S^2$, the sheet R being stretched on the under surface of the frame $S'$, which latter is yieldingly mounted on screw rods $N^2$ the same as the frame N of the resistance for the sheet L. The lower run is engaged by a tightening roller $O^5$ held vertically adjustable on the main frame A; and in order to impart a simultaneous rotation to the drums $O^2$, $O'$, the shafts $O^3$, $O^4$ thereof are provided with sprocket wheels $O^6$, $O^7$, over which pass sprocket chains $O^8$ also passing over the tightening roller $O^5$. The shaft $O^3$ is driven from the shaft $H^2$ previously mentioned and for this purpose a sprocket wheel $O^9$ is secured to the shaft $O^3$ (see Figs. 1 and 2) and over the sprocket wheel $O^9$ passes a sprocket chain $O^{10}$ also passing over a sprocket wheel $O^{11}$ secured on the shaft $H^2$. Now, when the latter is rotated a rotary motion is transmitted to the shaft $O^3$ to cause the apron O to travel in the direction of the arrow $d'$.

The under sides of the lower runs of the aprons F and O pass over the peripheral faces of rotary brushes T and T' journaled in suitable bearings on the main frame A, the said brushes serving to keep the aprons clean. The lower end of the apron F is adapted to deliver the shaped dough to the apron O and in order to prevent the shaped dough from sticking to the apron F a spring gate U is provided, having trunnions U' journaled in suitable bearings on the frame A. The free end of the spring gate U extends within a short distance of the upper run of the apron F over the drum $F^2$, as plainly shown in Fig. 3, and when the shaped dough comes in contact with the said free end of the spring gate U then the latter loosens the shaped dough on the apron F to allow the shaped dough to drop off the apron while passing around the drum $F^2$. The U-shaped gate U is normally held in the inclined position shown in Fig. 3, and for this purpose the gate is provided with an outwardly extending arm $U^2$ on which is adjustably held a weight $U^3$ by means of a set screw $U^4$. The free end of the gate U normally rests against pins $U^5$ projecting from the main frame A, it being understood that the slight swinging motion given to the swing gate U by the shaped dough allows the latter to pass underneath the free end of the swing gate, and after the dough has passed the swing gate returns to its normal position against the pins $U^5$ by the action of the weight $U^3$. The shaped dough after dropping off the apron F falls onto a swing chute V from which the dough drops down onto the apron O to be then carried through the second pressing and rolling device D'. The chute V is made to swing so as to prevent the shaped dough from losing its shape by its fall, and for this purpose the swing chute V is provided with trunnions V' journaled in suitable bearings carried on the guideways P'. On the upper surface of the chute V are arranged converging guides $V^2$ which tend to direct the shaped dough to the middle of the apron O. The upper end of the chute V is provided with a raised flange $V^3$ to direct the shaped dough down onto the upper surface of the chute in case the shaped dough should be thrown too far onto the chute V. A notched arm $V^4$ extends from the chute and on this arm is hung a weight $V^5$ to cause the chute V to abut against stop pins $V^6$ projecting from the guideways P'. Now when the piece of dough drops onto the free end of the chute V then the weight of the dough causes a slight swinging of the chute so that the shaped dough readily slides down the chute onto the endless apron O. As soon as the shaped dough leaves the chute V the latter swings back to its normal position against the stop pins $V^6$ by the action of the weight $V^5$. As illustrated in the drawings, the aprons F and O are slightly inclined and in reverse directions relative to each other, and the discharge end of the apron F is directly above the upper end of the apron O, the lower end of which is above an endless carrier W for carrying the shaped dough to the baking room.

Figure 11:
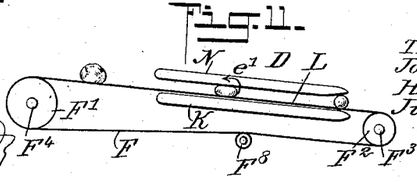
Fig. 11 is a diagrammatic side elevation of the first pressing and rolling device.

The operation is as follows: The prepared dough, arranged in lumps of a predetermined weight, say, one, two or more pounds, is successively placed into the hopper E between the gages E', so that the lump of dough falls onto the upper end of the apron F and is carried by the latter in the direction of the arrow $a'$ and forced under the revolving roller B' which flattens out the dough and then the latter in a flattened condition passes between the flanges $E^7$ and under the roller C', whereby the ends of the dough are turned up and at the same time a pressing or kneading action is given to the dough by the combined action of the apron F, the flanges $E^7$ and the roller C'. The dough carried onward by the apron F now passes underneath the sheet L and its frame N and rollers N' and which yield as the dough enters so that the dough is pressed on with sufficient force by the sheet L to cause the dough to roll around in the direction of the arrow $e'$, shown in Fig. 11. Now, as the dough advances between the apron F and the sheet L it is pressed and rolled at the same time, and, while passing with the apron F over the first set of rollers $K^2$ and below the cylindrical rollers N', the dough is rolled out flat, and when passing along with the apron F over the set of rollers $K^3$ and below the corresponding cylindrical rollers N' the dough is thinned in the middle and thickened towards the sides, and when the dough passes with the apron F over the rollers $K^4$ and below the corresponding cylindrical rollers N' then the dough is thickened at the middle and gradually tapered towards the end in the form of a Vienna roll, and this shape is maintained during the exit of the shaped dough from between the sheet L and the apron F. Now, during this rolling, pressing and kneading of the dough while passing through the device D the desired shape is given to the dough and at the same time the dough is formed with twists extending in one direction, as indicated in Fig. 13. The shaped dough after passing the gate U and being delivered by the chute V to the apron O is carried along by the latter in the direction of the arrow $d'$, so that the dough is now subjected to the action of the pressing and rolling device D', in which the same operation takes place as above described relative to the pressing and rolling device D, with the only one difference that the piece of dough is now rolled around in the reverse direction of the arrow $e'$, so that the twists given the dough by the action of the device D are eliminated and twists are given to the dough in a reverse direction, as illustrated in Fig. 14. It is understood that when the shaped dough is carried by the apron O underneath the sheet R, the dough is first flattened, then thinned at the middle and thickened at the sides, after which the dough is thickened in the middle and thinned toward the sides, so that the dough leaves the device D' in Vienna roll shape and is carried in this condition to the baking room by the carrier W. By treating the dough in the manner described, it will readily rise and bake properly without danger of cracking or breaking, at the same time producing an entirely smooth outer surface on the finished roll.

Figure 8:
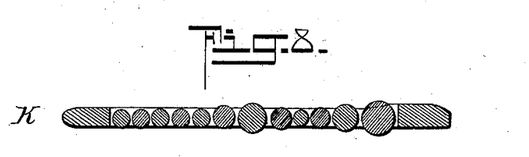
Fig. 8 is a sectional side elevation of a modified form of the same.
Figure 9:
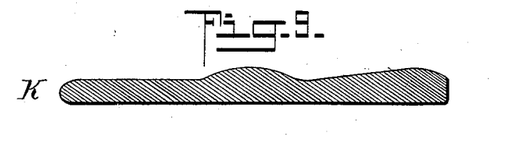
Fig. 9 is a like view of another modified form of the same.
Figure 10:
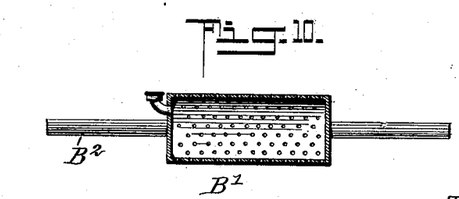
Fig. 10 is a transverse section of a modified form of the flattening roller.

For making loaves or rolls of different shape it is necessary to change the configuration of the resistances K and Q respectively; for instance, as shown in Figs. 8 and 9, it being understood that the resistance shown in Fig. 8 has sets of rollers different from the sets of rollers $K^2$, $K^3$, $K^4$, while in the resistance shown in Fig. 9 the rollers are omitted, and a slide bed is provided, having an undulating upper surface to insure the pressing, rolling and kneading of the dough and the shaping thereof according to the shape of the loaf or roll to be produced.

It is understood that the sets of rollers $K^2$, $K^3$, $K^4$ are preferable to a solid surface as the rollers reduce the friction of the traveling aprons F and O, and the aprons as well as the sheets L and R can readily flex at the spaces between adjacent rollers, so that a thorough kneading action is produced. It will also be noticed that by the use of the rollers $K^2$, $K^3$ and $K^4$ in the frame K' and the rollers N' in the frame N, the apron F as well as the sheet L can flex sufficiently into the spaces between adjacent rollers to form pockets to allow the dough to momentarily expand, the dough being pressed then again while passing a roller and while being carried along and rolling around as above described. The dough while passing through the second device D' is rolled out to greater length than in the first device D, that is, the dough leaves the second device in the desired shape and length.

In adjusting the machine from treating lumps of dough of one pound to lumps of dough of two pounds, for instance, it is necessary to adjust the nuts $N^2$ with a view to increase the space between the sheet L and the apron F, and in a like manner to adjust the sheet R relative to the apron O.

Having thus described our invention, we claim as new and desire to secure by Letters Patent:

1. A molding machine provided with a flattening device for flattening a lump of the material to press out air and gases, a turning device for turning up the edges of the material, a rolling and pressing device for rolling the material in one direction and simultaneously pressing it, a second rolling and pressing device for rolling the material in a reverse direction and simultaneously pressing it, and driving means for imparting motion to the various devices to treat the material in the sequence given.

2. A molding machine provided with a plurality of rolling and pressing devices, of which one device for rolling a sheet of material into a roll rolls the sheet in one direction and simultaneously presses it, and the other device subsequently rolls the sheet in the opposite direction and simultaneously presses it.

3. A molding machine provided with rolling devices for rolling a sheet of material into a roll, of which one rolls the sheet in one direction and the other subsequently rolls the sheet in the opposite direction, to unroll the twist given to the sheet by the first rolling device.

4. A molding machine provided with a rolling and pressing device for rolling a sheet of material into a roll in one direction and simultaneously pressing it, and a rolling device for subsequently rolling the sheet in the opposite direction to unroll the twist given to the sheet during the first rolling action.

5. A molding machine provided with a turning device comprising a straight traveling surface, and a roller having a convex peripheral face between which and the said surface passes the material to be treated.

6. A molding machine provided with a turning device comprising a straight traveling surface, a roller having a convex peripheral face between which and the said surface passes the material to be terated, and flanges on opposite sides of the roller and directly over the said traveling surface.

7. A molding machine provided with an endless traveling apron, a roller over the said apron and between which and the apron passes the material to be treated, and fixed flanges directly above the said apron said roller being mounted directly between the flanges and coöperating therewith to turn up the edges of the material.

8. A molding machine provided with an endless traveling apron, a roller over the said apron and between which and the apron passes the material to be treated, fixed flanges directly above the said apron said roller being mounted directly between the flanges and coöperating therewith to turn up the edges of the material, and means for sustaining the apron below the said flanges.

9. A molding machine provided with an endless traveling apron, a roller over the said apron and between which and the apron passes the material to be treated, fixed flanges directly above the said apron, said roller being mounted directly between the flanges and coöperating therewith to turn up the edges of the material and means for sustaining the apron below the said flanges and leaving the apron unsupported below the said roller.

10. A molding machine provided with an endless traveling apron, a hopper over the said apron and open at the bottom, gages in the said hopper and extending in the direction of the travel of the said apron, and a flattening roller extending transversely in the said hopper above the said apron.

11. A molding machine provided with an endless traveling apron, a hopper over the said apron and open at the bottom, gages in the said hopper and extending in the direction of the travel of the said apron, a flattening roller extending transversely in the said hopper above the said apron, a turning over roller extending transversely in the said hopper across the said apron, and flanges fixed on the said gages and extending over the apron at opposite sides of the said turning over roller.

12. A molding machine provided with an endless traveling apron, a hopper over the said apron and open at the bottom, gages in the said hopper and extending in the direction of the travel of the said apron, a flattening roller extending transversely in the said hopper above the said apron, a turning over roller extending transversely in the said hopper across the said apron, flanges fixed on the said gages and extending over the apron at opposite sides of the said turning over roller, and means for adjusting the gages and their flanges transversely on the hopper.

13. A molding machine provided with an endless traveling apron, a hopper over said apron and open at the bottom, gages in the said hopper and extending in the direction of the travel of the said apron, a flattening roller extending transversely in the said hopper above the said apron, a turning over roller extending transversely in the said hopper across the said apron, the turning over roller having a convex peripheral face, and flanges fixed on the said gages and extending over the apron at opposite sides of the said turning over roller.

14. A molding machine having a rolling and pressing device, comprising an endless traveling apron and a sheet of fabric material yieldingly mounted relative to the said apron, for the material to pass between the same to be pressed and rolled in the reverse direction of the travel of the apron.

15. A molding machine having a rolling and pressing device, comprising an endless traveling apron, and a sheet of fabric material yieldingly mounted relative to the said apron, for the material to pass between the same to be pressed and rolled in the reverse direction of the travel of the apron and shaped to gradually decrease and then increase the distance between the apron and sheet in a longitudinal direction.

16. A molding machine having a rolling and pressing device, comprising an endless traveling apron, and a sheet of fabric material yieldingly mounted relative to the said apron, for the material to pass between the same to be pressed and rolled in the reverse direction of the travel of the apron and shaped to gradually decrease and then increase the distance between the apron and sheet in a longitudinal direction, and to gradually increase and decrease from the middle to the sides.

17. A molding machine having a rolling and pressing device, comprising an endless traveling apron, a sheet of fabric material yieldingly mounted relative to the said apron, for the material to pass between the same to be pressed and rolled in the reverse direction of the travel of the apron, and means for giving resistance to the said apron and the said sheet of fabric material, the resistance comprising sets of transverse rollers curved in the direction of their length according to the shape to be given to the material.

18. A molding machine having a rolling and pressing device, comprising an endless traveling apron, a sheet of fabric material yieldingly mounted relative to the said apron, for the material to pass between the same to be pressed and rolled in the reverse direction of the travel of the apron, and means for giving resistance to the said apron and the said sheet of fabric material, the resistance having parallel surfaces adjacent to the entrance end of the material, convex surfaces at the middle and concave surfaces adjacent to the exit end of the material.

19. A molding machine provided with a pressing and rolling device comprising an endless traveling apron, a fixed sheet of fabric material in juxtaposition thereto, a sheet frame for supporting the said sheet, transverse rollers journaled in the said frame to give resistance to the said sheet, and an apron frame having transverse rollers for giving resistance to the said apron.

20. A molding machine provided with a pressing and rolling device comprising an endless traveling apron, a fixed sheet of fabric material in juxtaposition thereto, a sheet frame for supporting the said sheet, transverse rollers journaled in the said frame to give resistance to the said sheet, an apron frame having transverse rollers for giving resistance to the said apron, and means on which the said sheet frame is yieldingly mounted.

21. A molding machine provided with a pressing and rolling device comprising an endless traveling apron, a fixed sheet of fabric material in juxtaposition thereto, a sheet frame for supporting the said sheet, transverse rollers journaled in the said frame to give resistance to the said sheet, an apron frame having transverse rollers for giving resistance to the said apron, means on which the said sheet frame is yieldingly mounted, and springs pressing the said sheet frame.

22. A molding machine provided with a pressing and rolling device, comprising an endless traveling apron, a fixed sheet of fabric material in juxtaposition thereto, a sheet frame for supporting the said sheet, transverse rollers journaled in the said frame to give resistance to the said sheet, an apron frame having transverse rollers for giving resistance to the said apron, and means for adjusting the said sheet frame to move the sheet nearer to or further from the apron.

23. A molding machine provided with a pressing and rolling device, comprising an endless traveling apron, a fixed sheet of fabric material in juxtaposition thereto, a sheet frame for supporting the said sheet, transverse rollers journaled in the said frame to give resistance to the said sheet, an apron frame having transverse rollers for giving resistance to the said apron, means for adjusting the said sheet frame to move the sheet nearer to or further from the apron, and means to allow the sheet frame to yield.

24. A molding machine provided with a pressing and rolling device, comprising an endless traveling apron, a sheet of fabric material in juxtaposition thereto, a sheet frame for supporting the said sheet, transverse rollers journaled in the said frame to give resistance to the said sheet, and an apron frame having transverse rollers for giving resistance to the said apron, the rollers in the said sheet frame being cylindrical and sundry of the rollers in the apron frame being cylindrical, others convex and others concave.

25. A molding machine provided with a pressing and rolling device, comprising an endless traveling apron, a fixed sheet of fabric material in juxtaposition thereto, a sheet frame for supporting the said sheet, transverse rollers journaled in the said frame and giving resistance to the said sheet, and an apron frame having transverse rollers for giving resistance to the said apron, the said frames having flaring mouths both at the entrance and exit ends.

26. A molding machine provided with a pressing and rolling device, comprising an endless traveling apron, a sheet of fabric material in juxtaposition thereto, a sheet frame for supporting the said sheet, transverse rollers journaled in the said frame to give resistance to the said sheet, and an apron frame having transverse rollers for giving resistance to the said apron, the rollers in the said sheet frame being cylindrical, and a plurality of the rollers in the apron frame adjacent to the entrance end thereof being cylindrical, a plurality of rollers at the middle of the apron frame being convex and a plurality of the rollers at the exit end of the apron frame being concave.

27. A molding machine having a plurality of pressing and rolling devices alike in construction and each having an endless traveling apron, a sheet of fabric material, and resistances for the apron and the sheet, the said devices being located one above the other, the apron of the upper device discharging on to the apron of the lower device, and the said devices being inclined in opposite directions.

28. A molding machine having a plurality of pressing and rolling devices alike in construction and each having an endless traveling apron, a sheet of fabric material, resistances for the apron and the sheet, the said devices being located one above the other, the apron of the upper device discharging onto the apron of the lower device, and a swing gate at the discharge end of the upper apron.

29. A molding machine having a plurality of pressing and rolling devices alike in construction and each having an endless traveling apron, a sheet of fabric material, resistances for the apron and the sheet, the said devices being located one above the other, the apron of the upper device discharging onto the apron of the lower device, a swing gate at the discharge end of the upper apron, and a chute for directing the material from the upper apron to the lower apron.

30. A molding machine provided with a flattening device for flattening a lump of the material to press out air and gases, a turning device for turning up the edges of the material, a rolling and pressing device for rolling the material in one direction and simultaneously pressing it, a second rolling and pressing device for rolling the material in a reverse direction and simultaneously pressing it, driving means for imparting motion to the various devices to treat the material in the sequence given, and means for supplying a non-adherent substance to the material at the said flattening device.

31. A molding machine provided with a flattening device for flattening a lump of the material to press out air and gases, a turning device for turning up the edges of the material, a rolling and pressing device for rolling the material in one direction and simultaneously pressing it, a second rolling and pressing device for rolling the material in a reverse direction and simultaneously pressing it, driving means for imparting motion to the various devices to treat the material in the sequence given, and means for supplying a non-adherent substance to the material at the said turning device.

32. A molding machine provided with a flattening device, a turning up device, and a pressing device, one active member being common to all the said devices.

33. A molding machine provided with a flattening device, a turning up device, and a pressing and rolling device, an endless traveling apron being common to all the said devices.

34. A molding machine provided with a flattening roller, a turning up roller, a stretched sheet, and an endless apron operating in conjunction with the said rollers and sheet.

35. A molding machine provided with a flattening roller, a turning up roller, a stretched sheet, an endless apron operating in conjunction with the said rollers and sheet, and resistances, one for the said sheet and the other for the said apron opposite the sheet.

36. A molding machine provided with a traveling apron, a plurality of rollers forming a resistance over which the apron passes, and a sheet above the apron at the said rollers, the material carried along by the apron being rolled around by the combined action of the apron and sheet.

37. A molding machine provided with a traveling apron, a plurality of rollers forming a resistance over which the apron passes, a sheet above the apron at the said rollers, the material carried along by the apron being rolled around by the combined action of the apron and sheet, and rollers over which the sheet is stretched and arranged opposite the said rollers for the apron.

38. A molding machine having a traveling apron, and a frame having a plurality of rollers forming a resistance over which passes the apron.

39. A molding machine having a traveling apron, and a frame having rollers over which passes the apron, the rollers being arranged in sets of different shape.

40. A molding machine having a traveling apron, and a frame having rollers over which passes the apron, the rollers being arranged in sets, one of the sets being cylindrical, another set convex and another set concave.

41. A molding machine provided with a traveling apron, and a roller operating in conjunction with the said apron and having its peripheral face convex in cross section.

42. A molding machine provided with a traveling apron, a roller operating in conjunction with the said apron and having its peripheral face convex in cross section, and spaced parallel flanges on opposite sides of the said roller and extending in the direction of the travel of the apron.

In testimony whereof we have signed our names to this specification in the presence of two subscribing witnesses.

THOMAS H. KELLER.
JOHN A. HAAS.
HENRY B. KELLER.
JULIUS H. KELLER.

Witnesses to the signatures of Thomas H. Keller and John A. Haas:
CHRISTIAN G. BASSLER,
OBED R. WHITMYER.

Witnesses to the signature of Henry B. Keller:
CARRIE REDEKER,
HARRY REDEKER.

Witnesses to the signature of Julius H. Keller:
C. N. DERR,
GEORGE BUTZER.